United States Patent
Mahanta et al.

(10) Patent No.: US 11,966,394 B2
(45) Date of Patent: Apr. 23, 2024

(54) BILL OF MATERIALS TRAVERSAL TO HANDLE LOGICAL UNITS OF WORK FOR IN-MEMORY DATABASES

(71) Applicant: SAP SE, Walldorf (DE)

(72) Inventors: Prabal Mahanta, Bangalore (IN); Aavishkar Bharara, Bangalore (IN); Amritha Pulikool, Bangalore (IN); Swarnima Sneh, Bangalore (IN)

(73) Assignee: SAP SE, Walldorf (DE)

( * ) Notice: Subject to any disclaimer, the term of this patent is extended or adjusted under 35 U.S.C. 154(b) by 80 days.

(21) Appl. No.: 17/729,927

(22) Filed: Apr. 26, 2022

(65) Prior Publication Data

US 2023/0342357 A1    Oct. 26, 2023

(51) Int. Cl.
*G06F 16/245* (2019.01)
*G06F 9/54* (2006.01)
*G06F 16/2453* (2019.01)

(52) U.S. Cl.
CPC .......... *G06F 16/24542* (2019.01); *G06F 9/54* (2013.01); *G06F 16/24532* (2019.01)

(58) Field of Classification Search
CPC .................. G06F 16/24542; G06F 16/24532
See application file for complete search history.

(56) References Cited

U.S. PATENT DOCUMENTS

2007/0208669 A1* 9/2007 Rivette ................ G06Q 50/184
                                                                        705/310

OTHER PUBLICATIONS

SAP, "BOM Explosion," <https://help.sap.com/viewer/43fa3cddb00348beb3ed12212a94448f/LATEST/en-US/1dc1ba538c95b54ce10000000a174cb4.html>, 2 pages (accessed Mar. 18, 2022).

Reynaud, J., "Identifying the Bill of Materials (BOM) Structure in Databases," <https://vertabelo.com/blog/identifying-the-bill-of-materials-bom-structure-in-databases/>, Vertabelo, 13 pages (Jun. 9, 2016).

Tinnefeld, C., Wagner, B., & Plattner, H. (2012). Operating on hierarchical enterprise data in an in-memory column store. *DBKDA 2012*, 65, pp. 58-63.

(Continued)

*Primary Examiner* — Baoquoc N To
(74) *Attorney, Agent, or Firm* — Klarquist Sparkman, LLP

(57) ABSTRACT

Technologies are described for managing database queries based on bill of materials (BOM). For example, a set of database queries can be optimized (e.g., in terms of time and sequence of execution) based on a BOM explosion. In some implementations, database queries are managed by generating a BOM for an application programming interface (API) call. Various data structures can be created from the BOM, which can comprise procedure information, application and action information, and/or hierarchy information. A logical sequence of execution can be determined based, at least in part, on one or more of the data structures, where the logical sequence of execution comprises a plurality of database queries to execute the API call. The logical sequence of execution can be optimized to produce an optimized sequence of execution. The API call can be executed according to the optimized sequence of execution.

20 Claims, 8 Drawing Sheets

(56) References Cited

OTHER PUBLICATIONS

Dasgupta, S.S., Mahanta, P., Pradeep, S. and Subramanian, G., Oct. 2014. Reporting optimizations with bill of materials hierarchy traversal in in-memory database domain using set oriented technique. In *OTM Confederated International Conferences "On the Move to Meaningful Internet Systems"* (pp. 91-95). Springer, Berlin, Heidelberg.

Sakr, S., Elnikety, S., & He, Y. (2014). Hybrid query execution engine for large, attributed graphs. *Information Systems*, 41, 45-73.

\* cited by examiner

Initial logical sequence of execution 510

Logical sequence of execution 520

Logical sequence of execution 530

Logical sequence of execution 540

US 11,966,394 B2

BILL OF MATERIALS TRAVERSAL TO HANDLE LOGICAL UNITS OF WORK FOR IN-MEMORY DATABASES

BACKGROUND

With current database systems, integration is a key topic. Integration allows multiple applications to work together to accomplish tasks. For example, generating a customer invoice may involve performing actions within multiple applications, such as a project management application, a finance application, and a sales application.

For example, a middle tier solution can perform process orchestration that integrates various applications or modules by creating a logical unit of work (LUW). A logical unit of work refers to a number of steps or operations, whose changes are written to the database as a LUW. This ensures that all changes are written to the database for the LUW, and otherwise the changes are reversed (e.g., by performing a database rollback).

While integration using traditional LUW solutions makes it easier to work as a team, there are still significant issues. For example, traditional LUW solutions may involve multiple database operations in an inefficient manner (e.g., sequentially). For example, operations related to a first application may have to wait until operations related to a second application are performed, leading to delays in performing database activities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for determining an optimized sequence of execution from a dynamically generated bill of materials (BOM). For example, a BOM can be dynamically generated for an application programming interface (API) call, where the BOM comprises BOM components from a plurality of applications, and where the BOM is represented by a hierarchical structure. A hierarchy table can be created from the BOM, where the hierarchy table is a flattened representation of the hierarchical structure of the BOM, and where the hierarchy table comprises traversal order information and level information for the BOM components. A logical sequence of execution can be determined based, at least in part, on the hierarchy table, where the logical sequence of execution comprises a plurality of database queries to execute the API call. The logical sequence of execution can be optimized to produce an optimized sequence of execution, where optimizing the logical sequence of execution uses static dependency analysis and orthogonal dependency analysis. The API call can be executed according to the optimized sequence of execution, and a result of executing the API call can be output.

As another example, a BOM can be dynamically generated for an API call, where the BOM comprises BOM components from a plurality of applications, and where the BOM is represented by a hierarchical structure. A first data structure can be created comprising procedure information for the BOM. A second data structure can be created comprising information indicating a plurality of actions that can be performed for the applications, where each application can be associated with one or more actions, of the plurality of actions. A third data structure can be created from the BOM using, at least in part, the first data structure and the second data structure, where the third data structure is a flattened representation of the hierarchical structure of the BOM, and where the third data structure comprises traversal order information and level information for the BOM components. A logical sequence of execution can be determined based, at least in part, on the third data structure, where the logical sequence of execution comprises a plurality of database queries to execute the API call. The logical sequence of execution can be optimized to produce an optimized sequence of execution, where optimizing the logical sequence of execution uses static dependency analysis and orthogonal dependency analysis. The API call can be executed according to the optimized sequence of execution, and a result of executing the API call can be output.

DETAILED DESCRIPTION

Overview

Figure 1:
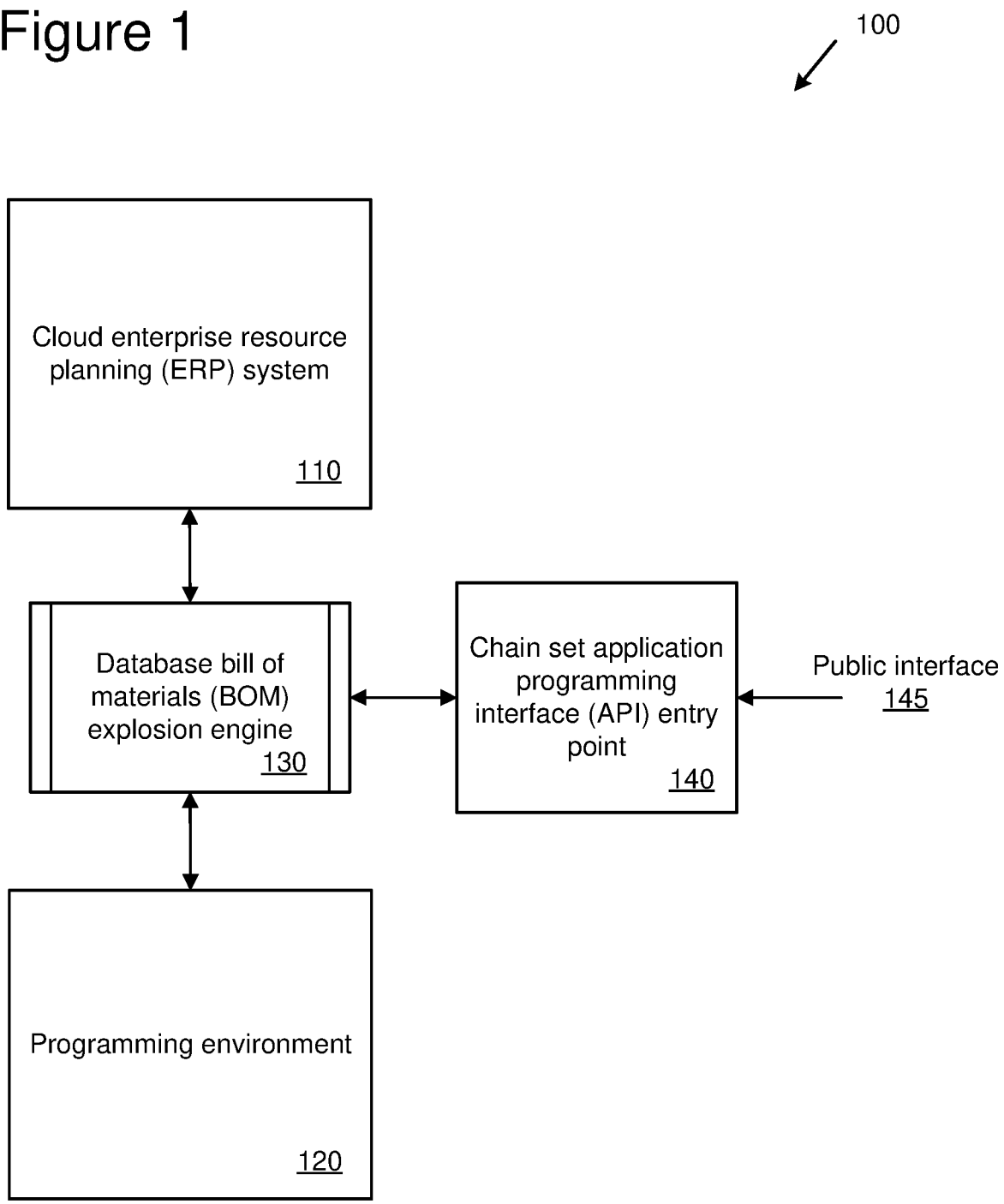
FIG. 1 is an example environment that supports chain set application programming interfaces (APIs) using bill of materials (BOM) explosions.

The following description is directed to technologies for managing database queries based on bill of materials (BOM). For example, a set of database queries can be optimized (e.g., in terms of time and sequence of execution) based on a BOM explosion (e.g., based on a traversal of the BOM). In some implementations, database queries are managed by generating a BOM for an application programming interface (API) call, where the BOM comprises BOM components from a plurality of applications, and where the BOM is represented by a hierarchical structure. A hierarchy table is created from the BOM, where the hierarchy table is a flattened representation of the hierarchical structure of the BOM, and where the hierarchy table comprises traversal order information and level information for the BOM components. A logical sequence of execution is determined based on the hierarchy table, where the logical sequence of execution comprises a plurality of database queries to execute the API call. The logical sequence of execution is optimized to produce an optimized sequence of execution, where optimizing the logical sequence of execution uses static dependency analysis, orthogonal dependency analysis, and/or other types of analysis. The API call is executed according to the optimized sequence of execution. Results of executing the API call can be output (e.g., returned to a client application that submitted the API call).

In some implementations, the technologies for managing database queries using BOMs are implemented in the context of an in-memory database. Using an in-memory database, such as the SAP HANA® database, provides more efficient database access (e.g., providing faster columnar in-memory read operations). However, the technologies are not limited to in-memory databases, and can be implemented using other types of databases.

Integration within database environments, such as enterprise resource planning (ERP) systems, is an important factor in customer success. Integration is a key driver that connects all of the application domains together and is often managed in the middle tier of the database environment. For example, the middle tier can manage process orchestration and integrate the various applications (e.g., applications in various domains such as finance applications, enterprise portfolio and project management applications, project system applications, material management applications, sales and distribution applications, and/or other applications that run in, or utilize, database backends). Process integration can be performed by integrating the various applications by creating logical units of work (LUW). A logical unit of work is a sequence of actions that are tied together as a self-contained unit (e.g., as a business process).

Such integration within database environments is useful in that it enables teams to work independently or as a unit. However, there are a number of challenges in that managing an integrated process is complex (e.g., with multiple database calls to manage, multiple failure modes to account for, etc.). Furthermore, efficiency can be a problem with process integration. For example, if a database call involves execution of queries related to multiple applications, then a standard approach may be to execute the queries serially. However, this standard approach can be time consuming and inefficient (e.g., utilizing large amounts of computing resources).

The technologies described herein provide improvements over existing integration solutions. For example, a BOM can be dynamically generated based on a received API call. Using the dynamically generated BOM, various data structures can be generated (e.g., data structures representing procedures, applications and associated actions, BOM hierarchies, and/or other data structures). Using the various data structures, a logical sequence of execution can be determined for the queries involved with the API call. The logical sequence of execution can be optimized to determine an optimized sequence of execution for executing the API call. The logical sequence of execution can then be used to execute the API call. Because the BOM and the various data structures are automatically and dynamically generated based on an API call, they are specific to the queries involved with the API call and are optimized for executing the API call (e.g., optimized in terms of time ordering, snapshot ordering, execution in parallel, etc.). In other words, the BOM and the various data structures are dynamically generated in real-time, and are not pre-configured.

Example Environments for Optimizing Database Queries Using BOM Hierarchies

In the technologies described herein, environments can be provided for using BOM hierarchies for optimizing database queries. For example, a database environment can expose APIs that utilize applications in multiple domains. A BOM hierarchy can be dynamically generated that represents these API calls. The BOM hierarchy can then be used (e.g., by dynamically generating various data structures) to dynamically optimize the various database queries (which an also include sub-queries) for a given API call, resulting in more efficient processing of the given API call (e.g., the given API call can be processed in less time and/or using fewer computing resources, such as processor and memory resources, network resources, number of database calls, etc.).

FIG. 1 depicts an example environment 100 that supports chain set application programming interfaces (APIs) using bill of materials (BOM) explosions. Specifically, the example environment 100 supports optimizing the API calls using the BOM explosions.

The example environment 100 includes a cloud enterprise resource planning (ERP) system 110. One example of a cloud ERP system is the SAP S/4HANA® Cloud ERP system. The example environment 100 also includes a programming environment 120 for the cloud ERP system 110. One example of such a programming environment is the SAP® advanced business application programming (ABAP®) environment. Using the programming environment 120, developers can create application programs that utilize the cloud ERP system 110.

The example environment also includes a database bill of materials (BOM) explosion engine 130. The BOM explosion engine 130 operates between the cloud ERP system 110 and the programming environment 120. The BOM explosion engine 130 facilitates generation of APIs, including chain set APIs that are accessed via the chain set API entry point 140. In some implementations, the chain set API entry point 140 is an open data protocol (OData) API.

The chain set API entry point 140 provides a public interface 145 to the database environment 100. For example, the public interface 145 can receive an API call from a client application (e.g., a client database application running on a client computing device), execute various database operations according to the API call (e.g., using the BOM explosion engine 130 to optimize the sequence of queries), and return a result of the API call to the client application (e.g., for display in a graphical user interface of the client application). In some implementations, the BOM is segregated into separate read and write BOM explosions.

The BOM explosion engine 130 dynamically generates a BOM hierarchy from an API call (e.g., from an API call received via the chain set API entry point 140). The dynamically generated BOM hierarchy can comprise BOM components (also referred to as BOM procedures) from a plurality of applications (or specific actions within an application). For example, the API call could be an API call to generate an invoice that involves operations performed by a finance application as well as operations performed by a sales and distribution application. In this example, the dynamically generated BOM would contain BOM components from both the finance application and the sales and distribution application.

Once the BOM explosion engine 130 has generated the BOM hierarchy, the BOM explosion engine 130 dynamically generates one or more data structures to determine the database operations (e.g., queries) that need to be executed when processing the API call.

In some implementations, the BOM explosion engine 130 dynamically generates a procedure table. The procedure table is a data structure that comprises information describing the BOM components. In some implementations, the information comprises, for each BOM component, a procedure name, a unique procedure identifier, and an indication of whether the BOM component is a master component.

In some implementations, the BOM explosion engine 130 dynamically generates an application table. The application table is a data structure that comprises information about the actions that can be performed for the applications. In some implementations, the information comprises, for each action, an action name, a unique action identifier, and the associated application.

In some implementations, the BOM explosion engine 130 dynamically generates a hierarchy table. The hierarchy table is a data structure that is a flattened representation of the hierarchical structure of the BOM, and that comprises traversal order information and level information for the BOM components. In some implementations, the hierarchy table is dynamically generated, at least in part, based on the procedure table and the application table.

Figure 2:
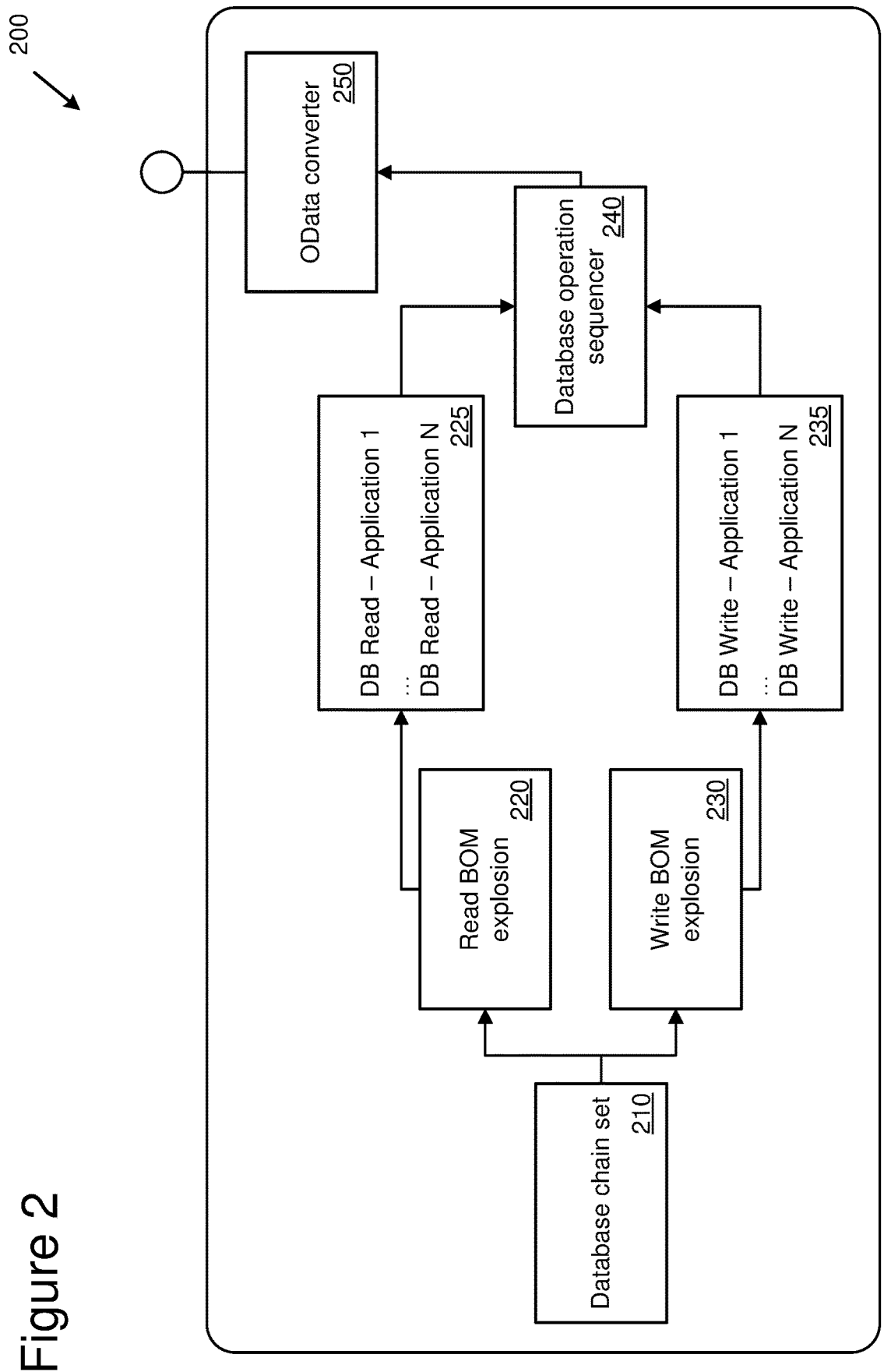
FIG. 2 is a diagram depicting an example BOM explosion engine.

FIG. 2 is a diagram depicting an example BOM explosion engine 200. For example, the example BOM explosion engine 200 represent the operation of BOM explosion engine 130. The example BOM explosion engine 200 is initiated when a database chain set 210 is received. For example, the database chain set 210 can comprise a BOM that includes elements from more than one application or domain and that can be segregated into a read BOM explosion and a write BOM explosion.

The example BOM explosion engine 200 first performs a technical segregation. With the technical segregation, the BOM components are segregated into those that read from the database (i.e., that do not alter database data), which are represented by read BOM explosion 220, and those that write to the database (i.e., that perform write, update, or delete operations), which are represented by write BOM explosion 230. The operations performed by the read BOM explosion 220 are organized into a first logical unit of work 225, and the operations performed by the write BOM explosion 230 are organized into a second logical unit of work 235. The first logical unit of work 225 is executed separately from the second logical unit of work 235.

The database operation sequencer 240 sequences the database operations within each logical unit of work. For example, the database operation sequencer 240 determines which database operations (e.g., queries) can run in parallel and which need to be run sequentially. The database operations that can run in parallel correspond to the number of chain sets, while each given set of database operations that run sequentially correspond to the elements of a given chain set.

The example BOM explosion engine 200 an also comprise an OData converter 250, which provides an OData API endpoint to access the example BOM explosion engine 200.

In the technologies described herein, the BOM hierarchy for a given application begins with a master BOM component for the given application, which in turn is connected to subsequent BOM components of the given application. The given BOM components for a given application that are actually utilized for a given API call depend on the action (or actions) that are performed for the given API call. The BOM hierarchy can involve multiple applications, with one application beginning at the root of the BOM hierarchy and other applications beginning at lower levels of the BOM hierarchy, as will be illustrated further below.

Figure 3:
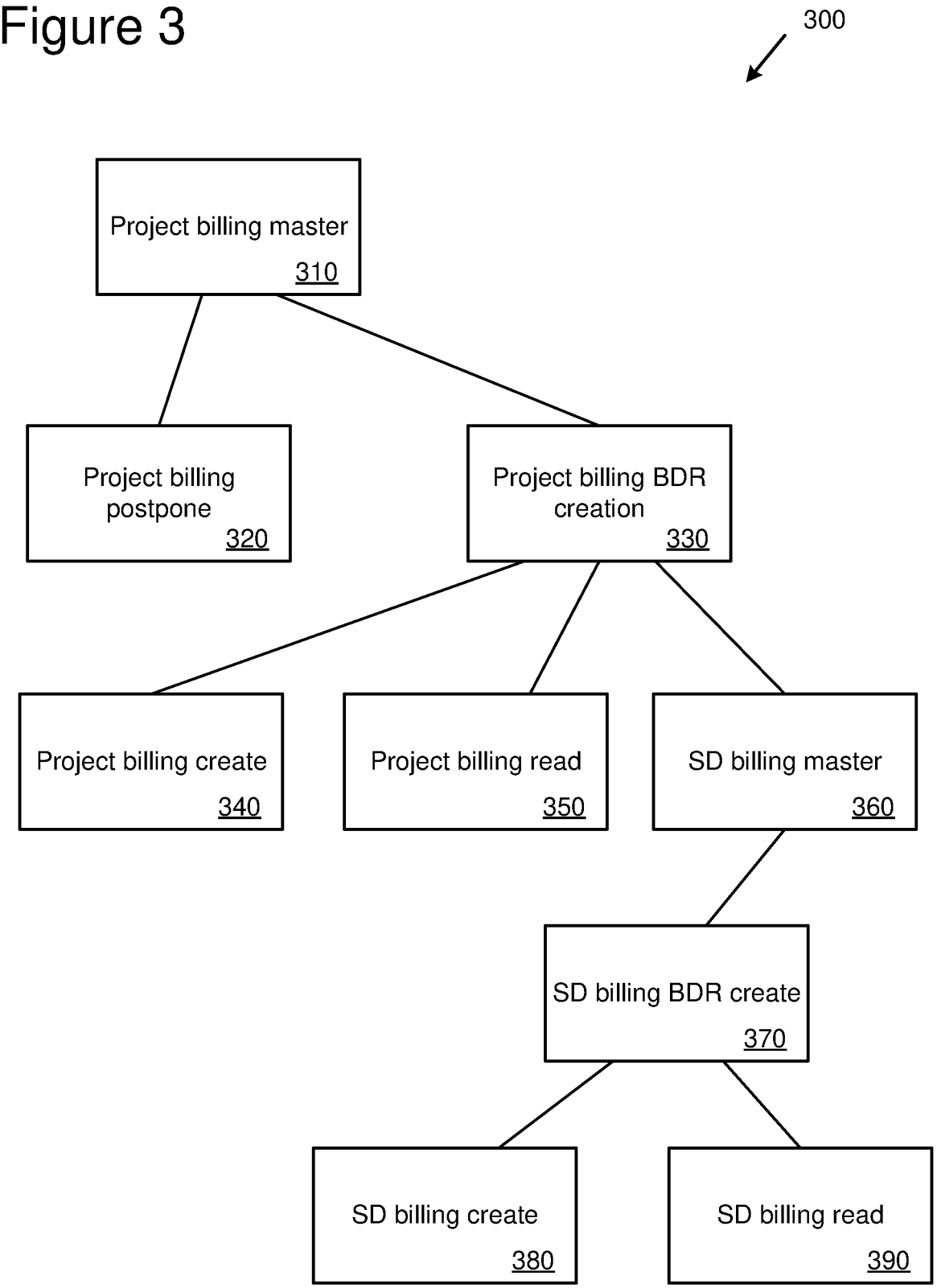
FIG. 3 depicts an example BOM hierarchy that includes BOM components from multiple applications.

FIG. 3 depicts an example BOM hierarchy 300 that includes BOM components from multiple applications. For example, the example BOM hierarchy 300 can be generated by a BOM explosion engine, such as BOM explosion engine 130. The example BOM hierarchy 300 comprises a number of BOM components related to a first application (e.g., a first application domain). Specifically, the BOM components related to the first application (which in this example is a Project System (PS) application) are the project billing master component 310 (which is the master BOM component at the root of the example BOM hierarchy 300), the project billing postpone component 320, the project billing BDR (billing document request) component 330, the project billing create component 340, and the project billing read component 350. The PS application also references the Sales and Distribution (SD) application, which begins with the SD billing master component 360, and continues with the SD billing BDR component 370, the SD billing create component 380, and the SD billing read component 390.

As illustrated in the example BOM hierarchy 300, the project billing master component 310 supports various actions, such as billing postponement (via the project billing postpone component 320) and BDR creation (project billing BDR creation component 330 and its BOM sub-components).

Using the example BOM hierarchy 300, the dynamic creation of the various data structures can be illustrated. In some implementations, a procedure table is generated. The below table, Table 1, depicts an example procedure table corresponding to the example BOM hierarchy 300. Specifically, the data Table 1 is dynamically generated from the example BOM hierarchy 300, and lists the procedure names, unique procedure identifiers, and an indication of whether each procedure is a master.

TABLE 1

Procedure Table

| Procedure Name | Procedure ID | Is Master |
| --- | --- | --- |
| ProjectBilling_Master | 55120 | Yes |
| ProjectBillingBDRCreation | 55129 | |
| ProjectBillingCreate | 55121 | |
| ProjectBillingPostpone | 55125 | |
| ProjectBillingRead | 55122 | |
| SDBilling_Master | 55987 | Yes |
| SDBillingCreate | 55988 | |
| SDBillingBDRCreate | 55985 | |
| SDBillingRead | 55989 | |

In Table 1, each procedure corresponds to one of the BOM components in the example BOM hierarchy 300. For example, the procedure name ProjectBilling_Master (procedure ID 55120) corresponds to the project billing master 310 BOM component, and so on.

In some implementations, an application table is generated. The below table, Table 2, depicts an example application table that is generated based on the example BOM hierarchy 300. Specifically, the data Table 2 is dynamically generated to represent the actions (also referred to as application actions) that can be performed in relation to the example BOM hierarchy 300, and lists the action names, unique action identifiers, and associated application for each action.

TABLE 2

Application Table

| Action Name | Action ID | Application |
| --- | --- | --- |
| SDBillingBDRcreation | 10 | SD Billing |
| ProjectBillingBDRcreation | 5 | PS Billing |
| ProjectBillingCreate | 2 | PS Billing |

Upon receiving a request (e.g., via an API call), a hierarchy table is dynamically generated (e.g., as an in-memory representation, and not as a traditional database table) using the procedure table (Table 1) and the application table (Table 2). For example, consider an API call for BDR creation that is received for the PS application (which has an action ID of 5 according to Table 2). Then, using the example BOM hierarchy 300, and Tables 1 and 2, the following hierarchy table (Table 3) is dynamically generated (e.g., beginning with the master BOM component for the PS application and proceeding recursively). Specifically, Table 3 lists the actions that would be performed, along with their associated procedures, to perform the BDR creation request (note that not all procedures may be performed for a given action). Table 3 also lists traversal order information and level information for the procedures within each action. In this example, the traversal order is preorder. However, in general, the traversal order can be inorder, preorder, or postorder (e.g., determined dynamically based on which is evaluated to produce the most efficient results).

TABLE 3

Hierarchy Table

| Action ID | Procedure ID | Traversal | Level |
|---|---|---|---|
| 5 | 55120 | 0 | 0 |
| 5 | 55129 | 1 | 1 |
| 5 | 55121 | 2 | 2 |
| 5 | 55122 | 3 | 2 |
| 5 | 55987 | 4 | 2 |
| 10 | 55987 | 0 | 0 |
| 10 | 55985 | 1 | 1 |
| 10 | 55988 | 2 | 2 |
| 10 | 55989 | 3 | 2 |
| 2 | 55120 | 0 | 0 |
| 2 | 55121 | 1 | 1 |

In some implementations, the traversal order is dynamically determined by minimizing retries and latency. For example, each traversal order can be evaluated in terms of number of retries (e.g., due to the constantly changing node values of the BOM) and latency (e.g., for traversing every node of the tree at least once). The most efficient traversal order (the one with the fewest retries and/or lowest latency) can then be selected and used.

When receiving a request (e.g., via an API call) to perform action ID 5, the hierarchy table depicted in Table 3 can be dynamically generated. Then, when performing action ID 5, the procedures listed in Table 5 can be performed in the traversal order listed in Table 5.

Figure 4:
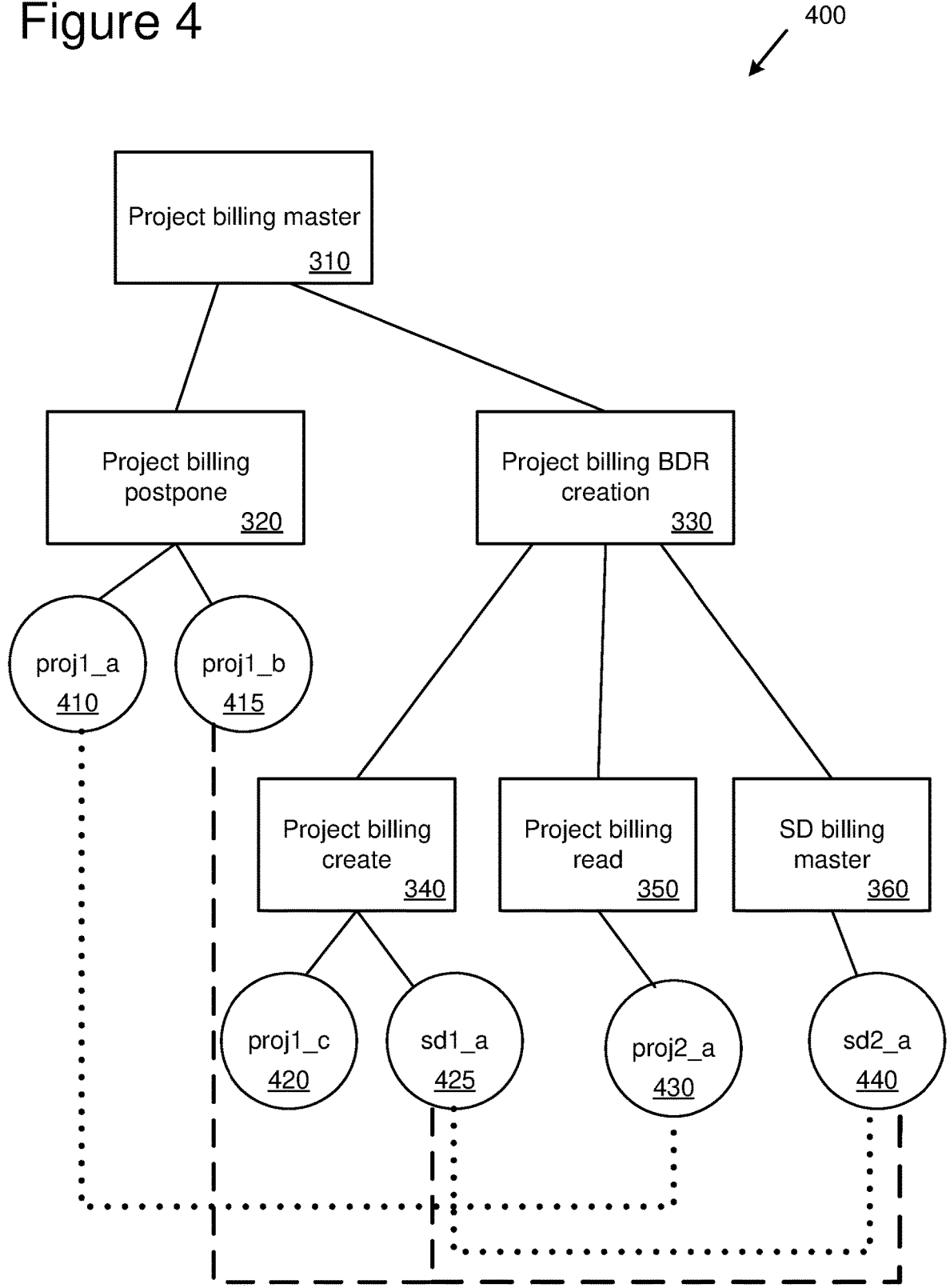
FIG. 4 depicts an example BOM hierarchy with associated queries and dependency information.

FIG. 4 depicts an example BOM hierarchy 400 with associated queries and dependency information. Specifically, the example BOM hierarchy 400 depicts a portion of the BOM components of the example BOM hierarchy 300, along with associated queries on database tables and dependency information between the queries.

As depicted in the example BOM hierarchy 400, various BOM components are associated with queries on database tables. Specifically, the project billing postpone component 320 is associated with the proj1_a query 410 and the proj1_b query 420. The project billing create component 340 is associated with the proj1_c query 420 and the sd1_a query 425. The project billing read component 350 is associated with the proj2_a query 430. Finally, the SD billing master component 360 is associated with the sd2_a query 440. For example, the proj1_a query 410 is a query used to perform the project billing postpone action that operates on database table "a" (e.g., this query could be a read query that reads database data from table "a"), while the proj2_a query 430 is used to perform the project billing read action and also operates on database table "a" (e.g., this query could be a write query that writes database data to table "a").

In some implementations, a logical sequence of execution is determined based, at least in part, on the BOM hierarchy (e.g., based on the hierarchy table generated from the BOM hierarchy). The logical sequence of execution comprises the database queries and/or sub-queries that are needed to perform some action (e.g., according to an API call). For example, with reference to the example BOM hierarchy 400, the logical sequence of execution could be the sequence of queries 410, 415, 420, 425, 430, and 440. However, the queries can typically not be executed in any order. For example, there may be various types of dependencies that enforce a particular order for executing the queries. In addition, various optimizations described herein can be used to improve the performance (e.g., reduce time needed for the execution and/or reduce usage of computing resources) of query execution (e.g., by executing certain queries in parallel and others in sequence).

The first type of dependency analysis that is performed is static dependency analysis. Static dependency analysis determines static dependencies that are present between queries. Static dependencies are those that are present at development time (e.g., based on query analysis, such as queries that access the same database table). In the example BOM hierarchy 400, static dependencies are depicted using the dotted lines, which depict a static dependency between queries 410 and 430, and between queries 425 and 440.

In some implementations, static dependency analysis is performed using a static dependency algorithm that operates according to the following pseudo code.
1. Identify the leaf operations under the lower root node.
2. If there are no common database procedures that are called inside each identified BOM operation, shift it towards the left.
3. If there are common database procedures, then shift left as far as possible such that the dependencies do not overlap.

The second type of dependency analysis that is performed is orthogonal dependency analysis. The orthogonal dependencies between queries are determined based on the data dependencies between the tables. In the example BOM hierarchy 400, orthogonal dependencies are depicted using the dashed lines, which depict orthogonal dependencies between queries 415, 425, and 440.

In some implementations, orthogonal dependency analysis is performed using an orthogonal dependency algorithm that operates according to the following pseudo code.
1. Parse through the set of tables in each BOM operation for each sequence.
2. If any common table is found with either: a) an already parsed operation, that is a write or read operation, and the current operation is a write operation on the same table, or b) a write operation and the current operation is read/write, then dependency with the operation is established and the BOM is shifted.
3. Execute the logic for the business function and compare the data with the dependency operation.
4. Check if the buffer data has common rows.
4a. If yes, then do not change the sequence.
4b. If no, then move the sequence to the left until the operations overlap.

Once the queries and their dependencies have been identified, the sequence of execution of the queries is determined. Determining the sequence of execution begins with an initial sequence of execution (also referred to as an initial logical sequence of execution) and proceeds through an optimization procedure to generate an optimized sequence of execution. The optimized sequence of execution can then be used to execute the queries (e.g., thus executing an API call).

Figure 5A:
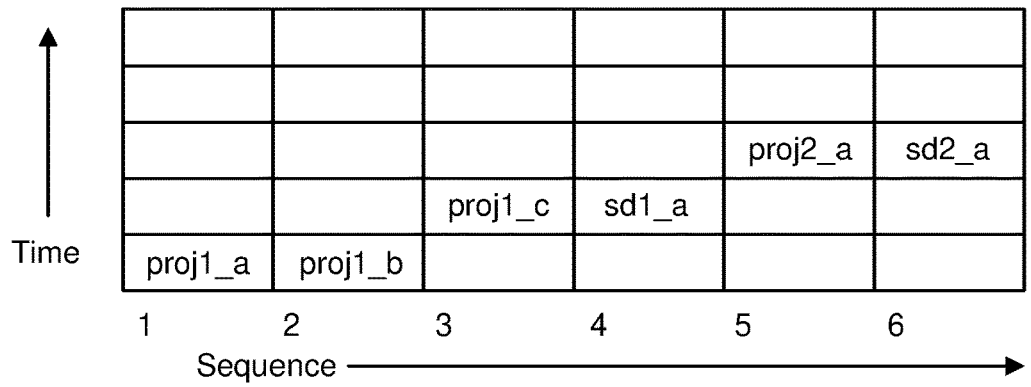
FIG. 5A depicts example sequences of execution of queries based on an example BOM hierarchy.
Figure 5A:
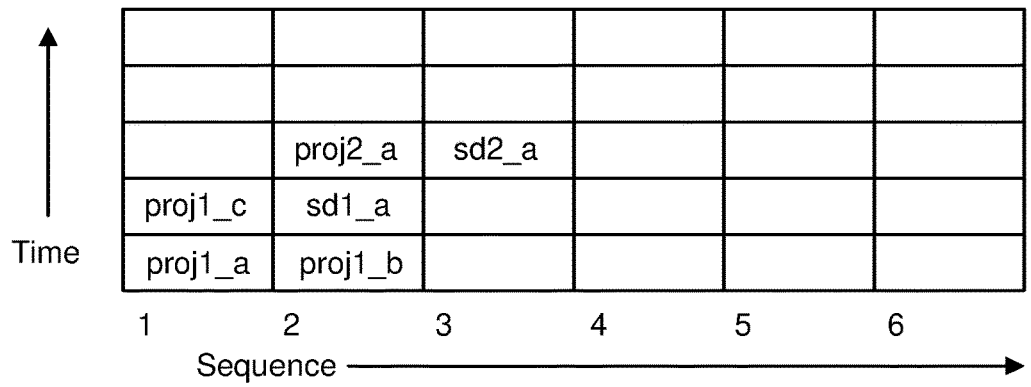
Figure 5A:
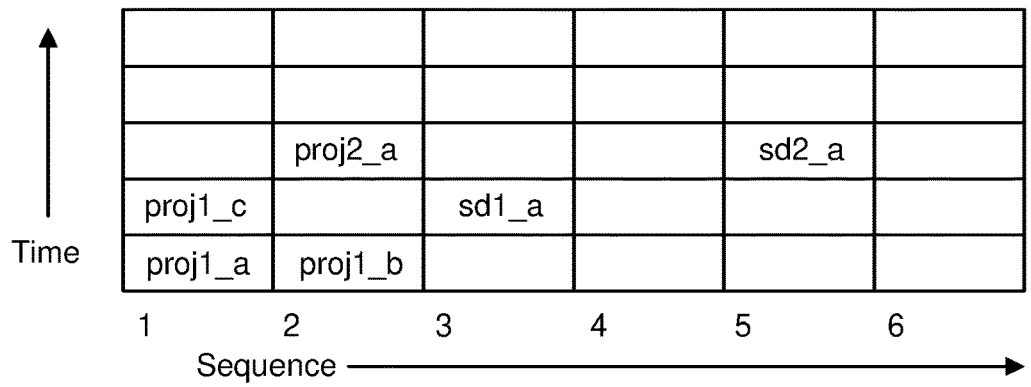

FIG. 5A depicts example sequences of execution of queries based on the example BOM hierarchy 400. The initial logical sequence of execution 510 depicts the sequence of execution of the queries in an execution chart format in which the sequence is along the x-axis (e.g., corresponding to one or more database snapshots) and the execution time is along the y-axis. According to the initial logical sequence of execution 510, the queries proj1_a and proj1_b can run in parallel, but in different sequences (e.g., in different snapshots). For example, proj1_a and proj1_b can run in parallel because there are no dependencies between them. Similarly, the queries proj1_c and sd1_a can run in parallel, but need to run after proj1_a and proj1_b as they are in a later time slot. Similarly, the queries proj2_a and sd2_a can run in parallel, but need to run after proj1_c and sd1_a as they are in a later time slot.

Next, the initial logical sequence of execution 510 is optimized based on static dependency analysis to produce logical sequence of execution 520. The result of this optimization procedure is that the queries can be executed in three sequences. However, this sequence does not take into account all dependencies.

Specifically, Using the static dependency algorithm, the initial logical sequence of execution 510 is optimized. In this example, queries proj1_a and proj1_b are part of a first operation, queries proj1_c and sd1_a are part of a second operation, and proj2_a and sd2_a are part of a third operation. Using the static dependency algorithm, proj1_c and sd1_a are identified as independent of proj1_a and proj1_b, and therefore shifted left, as shown in the intermediate table below (Table 4). In Table 4 below, queries proj1_c and sd1_a have been shifted two sequences to the left, as indicated by the arrows.

TABLE 4

Intermediate logical sequence of execution

|  |  |  | proj2_a | sd2_a |
| --- | --- | --- | --- | --- |
| proj1_c | sd1_a | ← | ← |  |
| proj1_a | proj1_b |  |  |  |

Then, using the static dependency algorithm, proj2_a is identified as independent of the already analyzed queries (proj1_a, proj1_b, proj1_c, and sd1_a). However, sd2_a is identified as dependent on sd1_a. Therefore proj2_a and sd2_a are shifted left as far as possible such that sd2_a and sd1_a do not overlap, which is depicted in logical sequence of execution 520.

Next, the logical sequence of execution 520 is further optimized based on orthogonal dependency analysis to produce logical sequence of execution 530. The result of this optimization procedure is that the sequence expands to a four step sequence in order to account for all dependencies.

Specifically, orthogonal dependency analysis is performed in this example using compression and expansion, which is performed back and forth. In this example, sd1_a is identified as dependent proj1_b, and therefore shifted to the right. Also, sd2_a is shifted further to the right to provide a one sequence gap between the two sd_a queries.

Figure 5B:
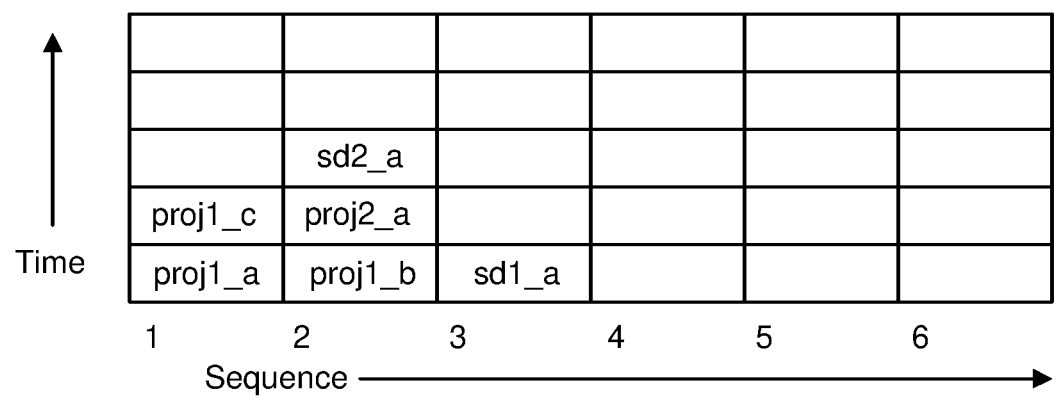
FIG. 5B depicts a further example sequence of execution of queries based on an example BOM hierarchy.

FIG. 5B depicts a final example sequence of execution of queries based on the example BOM hierarchy 400. Specifically, as depicted, the logical sequence of execution 530 is further optimized to compress the queries to produce the final logical sequence of execution 540, which is the optimized sequence of execution. In some implementations, this optimization procedure is performed based at least in part on forward and backward scheduling of database calls. In this example, sd1_a and sd2_a are identified as modifying two different tuples of the database table. So, even though they are modifying the same table, they are modifying a different set of records. Therefore, a dynamic determination is made that there are no dependencies between them, and they can run in parallel, and therefore they are shifted left.

Methods for Determining Optimized Sequences of Execution Using BOMs

In the technologies described herein, methods can be provided for determining optimized sequences of execution of queries using dynamically generated BOMs.

Figure 6:
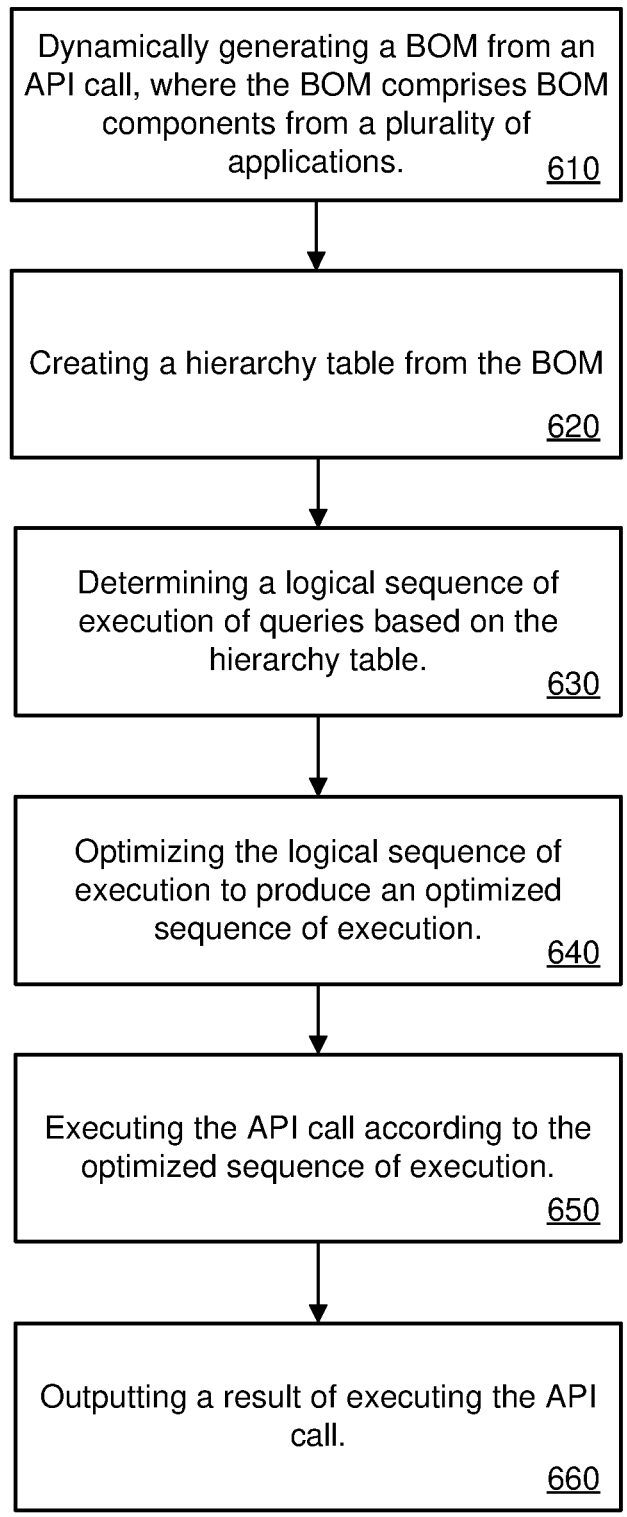
FIG. 6 is a diagram depicting an example flowchart for determining an optimized sequence of execution from a dynamically generated bill of materials (BOM).

FIG. 6 is a diagram depicting an example flowchart 600 for determining an optimized sequence of execution from a dynamically generated BOM. For example, the example method 600 can be performed by BOM explosion engine, such as BOM explosion engine 130.

At 610, a BOM is dynamically generated from an API call. The BOM comprises BOM components from a plurality of applications. The BOM is represented as a hierarchy, with a master BOM component of the application at a root of the BOM hierarchy and one or more additional master BOM components associated with one or more corresponding additional applications at lower levels of the BOM hierarchy.

At 620, a hierarchy table is created from the BOM that was dynamically generated at 610. The hierarchy table is a flattened representation of the hierarchical structure of the BOM. The hierarchy table comprises traversal order information and level information for the BOM components.

At 630, a logical sequence of execution of queries is determined based, at least in part, on the hierarchy table. The logical sequence of execution of queries is for executing the API call. For example, the hierarchy table (and/or additional tables) can be used to identify which BOM components are involved with performing various actions needed to execute the API call. From the identified BOM components, the queries needed to execute the API can be identified.

At 640, the logical sequence of execution is optimized to produce an optimized sequence of execution of the queries. In some implementations, optimizing the logical sequence of execution uses static dependency analysis and/or orthogonal dependency analysis. In some implementations, the optimized sequence of execution comprises information indicating the sequence ordering (e.g., database snapshot ordering) of the queries as well as time ordering of the queries (indicating which queries can be executed in parallel and which queries need to be executed sequentially).

At 650, the API call is executed according to the optimized sequence of execution that was determined at 640. At 660, a result of executing the API call is output. For example, the result can be returned to a client (e.g., via an OData API interface) for presentation to a user at the client (e.g., in a graphical user interface). For example, if the API call is a request to generate a billing invoice, then the result can be invoice details (e.g., which could be saved, viewed, and/or sent to a customer).

Computing Systems

Figure 7:
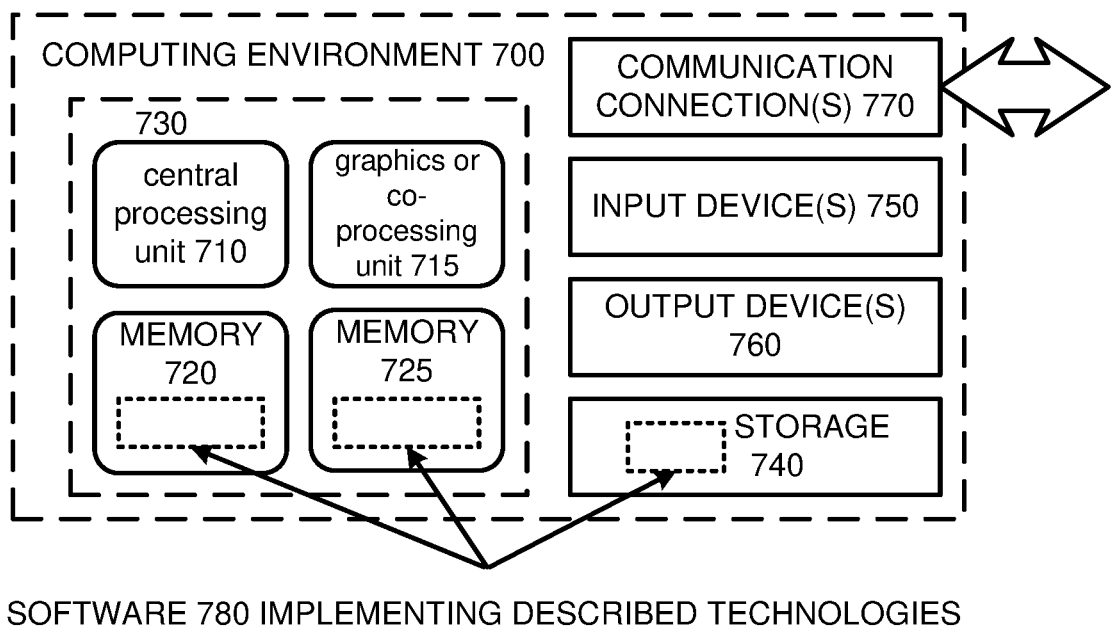
FIG. 7 is a diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 8:
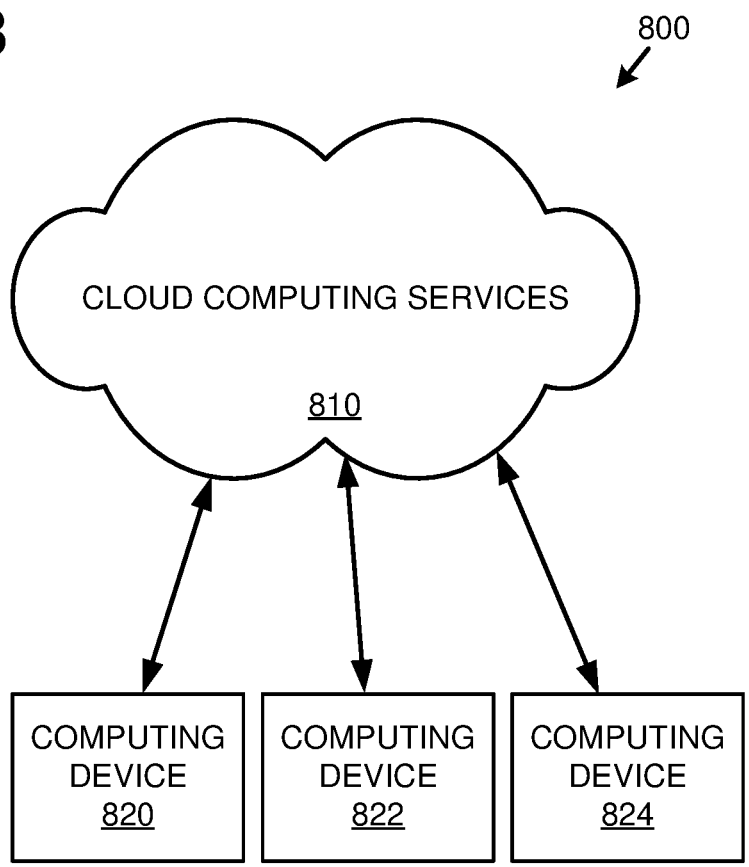
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, database resources, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections, such as 770.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, the method comprising:
   dynamically generating a bill of materials (BOM) for an application programming interface (API) call, wherein the BOM comprises BOM components from a plurality of applications, and wherein the BOM is represented by a hierarchical structure;
   creating a hierarchy table from the BOM, wherein the hierarchy table is a flattened representation of the hierarchical structure of the BOM, and wherein the hierarchy table comprises traversal order information and level information for the BOM components;
   determining a logical sequence of execution based, at least in part, on the hierarchy table, wherein the logical sequence of execution comprises a plurality of database queries to execute the API call;
   optimizing the logical sequence of execution to produce an optimized sequence of execution, wherein optimizing the logical sequence of execution uses:
   static dependency analysis; and
   orthogonal dependency analysis;
   executing the API call according to the optimized sequence of execution; and
   outputting a result of executing the API call.

2. The method of claim 1, further comprising:
   receiving the API call;
   wherein the BOM is generated in response to the API call.

3. The method of claim 1, further comprising:
   creating a procedure table, wherein the procedure table indicates, for each BOM component:
   a procedure name of the BOM component;
   a unique procedure identifier; and
   an indication of whether the BOM component is a master component;
   wherein the hierarchy table is created, at least in part, based on the procedure table.

4. The method of claim 1, further comprising:
   creating an application table, wherein the application table comprises information indicating a plurality of supported actions for the applications, wherein each application can be associated with one or more actions, of the plurality of supported actions;
   wherein the hierarchy table is created, at least in part, based on the application table.

5. The method of claim 4, further comprising:
   identifying which actions, of the plurality of supported actions, need to be performed to execute the API call;
   wherein the hierarchy table is created to represent the identified actions.

6. The method of claim 1, wherein the static dependency analysis is performed based, at least in part, on database table dependencies, and wherein the orthogonal dependency analysis is based, at least in part, on views and procedures.

7. The method of claim 1, wherein the logical sequence of execution indicates:
   a snapshot ordering of the plurality of queries; and
   a time ordering of the plurality of queries.

8. The method of claim 1, wherein optimizing the logical sequence of execution to produce the optimized sequence of execution comprises:
   determine which queries, of the plurality of queries, are executable in parallel, and which queries, of the plurality of queries, need to be executed sequentially.

9. The method of claim 1, wherein the BOM comprises a master BOM component for each application, of the plurality of applications.

10. The method of claim 1, wherein the API call is an open data protocol (OData) API call.

11. One or more computing devices comprising:
processors; and
memory;
the one or more computing devices configured, via computer-executable instructions, to perform operations comprising:
dynamically generating a bill of materials (BOM) for an application programming interface (API) call, wherein the BOM comprises BOM components from a plurality of applications, and wherein the BOM is represented by a hierarchical structure;
creating a hierarchy table from the BOM, wherein the hierarchy table is a flattened representation of the hierarchical structure of the BOM, and wherein the hierarchy table comprises traversal order information and level information for the BOM components;
determining a logical sequence of execution based, at least in part, on the hierarchy table, wherein the logical sequence of execution comprises a plurality of database queries to execute the API call;
optimizing the logical sequence of execution to produce an optimized sequence of execution, wherein optimizing the logical sequence of execution uses:
static dependency analysis; and
orthogonal dependency analysis;
executing the API call according to the optimized sequence of execution; and
outputting a result of executing the API call.

12. The one or more computing devices of claim 11, the operations further comprising:
creating a procedure table that indicates, for each BOM component:
a procedure name of the BOM component;
a unique procedure identifier; and
an indication of whether the BOM component is a master component;
wherein the hierarchy table is created, at least in part, based on the procedure table.

13. The one or more computing devices of claim 11, the operations further comprising:
creating an application table, wherein the application table comprises information indicating a plurality of supported actions for the applications, wherein each application can be associated with one or more actions, of the plurality of supported actions;
wherein the hierarchy table is created, at least in part, based on the application table.

14. The one or more computing devices of claim 11, wherein the static dependency analysis is performed based, at least in part, on database table dependencies, and wherein the orthogonal dependency analysis is based, at least in part, on views and procedures.

15. The one or more computing devices of claim 11, wherein the logical sequence of execution indicates:
a snapshot ordering of the plurality of queries; and
a time ordering of the plurality of queries.

16. The one or more computing devices of claim 11, wherein optimizing the logical sequence of execution to produce the optimized sequence of execution comprises:
determine which queries, of the plurality of queries, are executable in parallel, and which queries, of the plurality of queries, need to be executed sequentially.

17. One or more computer-readable storage media storing computer-executable instructions for execution on one or more computing devices to perform operations, the operations comprising:
dynamically generating a bill of materials (BOM) for an application programming interface (API) call, wherein the BOM comprises BOM components from a plurality of applications, and wherein the BOM is represented by a hierarchical structure;
creating a first data structure comprising procedure information for the BOM;
creating a second data structure comprising information indicating a plurality of supported actions for the applications, wherein each application can be associated with one or more actions, of the plurality of supported actions;
creating a third data structure from the BOM using, at least in part, the first data structure and the second data structure, wherein the third data structure is a flattened representation of the hierarchical structure of the BOM, and wherein the third data structure comprises traversal order information and level information for the BOM components;
determining a logical sequence of execution based, at least in part, on the third data structure, wherein the logical sequence of execution comprises a plurality of database queries to execute the API call;
optimizing the logical sequence of execution to produce an optimized sequence of execution, wherein optimizing the logical sequence of execution uses:
static dependency analysis; and
orthogonal dependency analysis;
executing the API call according to the optimized sequence of execution; and
outputting a result of executing the API call.

18. The one or more computer-readable storage media of claim 17, wherein the first data structure indicates, for each BOM component:
a procedure name of the BOM component;
a unique procedure identifier; and
an indication of whether the BOM component is a master component;
wherein the third data structure is created, at least in part, based on the first data structure.

19. The one or more computer-readable storage media of claim 17, the operations further comprising:
identifying which actions, of the plurality of supported actions, need to be performed to execute the API call;
wherein the third data structure is created to represent the identified actions.

20. The one or more computer-readable storage media of claim 17, wherein the logical sequence of execution indicates:
a snapshot ordering of the plurality of queries; and
a time ordering of the plurality of queries.

* * * * *